Sept. 2, 1947.  R. E. PETERSON  2,426,640
ELECTRIC MOTOR CONTROL CIRCUIT
Filed March 29, 1943  4 Sheets-Sheet 1

INVENTOR.
ROBERT E. PETERSON
BY
ATTORNEY

INVENTOR.
ROBERT E. PETERSON
BY
ATTORNEY

Sept. 2, 1947.  R. E. PETERSON  2,426,640
ELECTRIC MOTOR CONTROL CIRCUIT
Filed March 29, 1943  4 Sheets-Sheet 4

INVENTOR.
ROBERT E. PETERSON
BY
ATTORNEY

Patented Sept. 2, 1947

2,426,640

UNITED STATES PATENT OFFICE 2,426,640

ELECTRIC MOTOR CONTROL CIRCUIT

Robert E. Peterson, Danvers, Mass., assignor, by mesne assignments, to Submarine Signal Company, Boston, Mass., a corporation of Delaware Application March 29, 1943, Serial No. 481,058

12 Claims. (Cl. 172—152)

The present invention relates to the control of electrical equipment at points of limit of normal travel, as, for instance, in hoisting and lowering equipment, reciprocating apparatus or apparatus travelling in the defined course.

The invention is particularly useful in connection with hoisting and lowering equipment used in connection with the operation of subaqueous sound equipment for sound ranging and for depth sounding although the mechanism may also be applied to apparatus similarly operated for other purposes.

In submarine sound ranging apparatus it is customary to raise and lower a sound projector through a so-called sea chest in a vessel. When it is desired to use the equipment, it is lowered through the sea chest into the ocean water to the point of its farthest travel where it is seated in proper supporting housing sufficiently strong and steady so that it may be easily rotated on its shaft about a vertical axle. For this purpose limit switches have been employed permitting the hoisting and lowering of the shaft to the desired limit of travel. These limit switches are usually operated through electrical relays which at times stick, failing to shut off the motor driving the hoisting or lowering apparatus and thereby causing considerable damage to the housing structure.

The present invention has for its purpose the elimination of this danger and also the accurate seating of the apparatus in such a manner that danger to the equipment is avoided in spite of variations of ships' speed during the hoisting or lowering period.

Further merits and advantages of the present invention will be more fully and completely understood and explained in connection with the drawings showing an embodiment of the invention in which Fig. 1 shows a simplified schematic diagram of a circuit for the invention;

Figure 1:
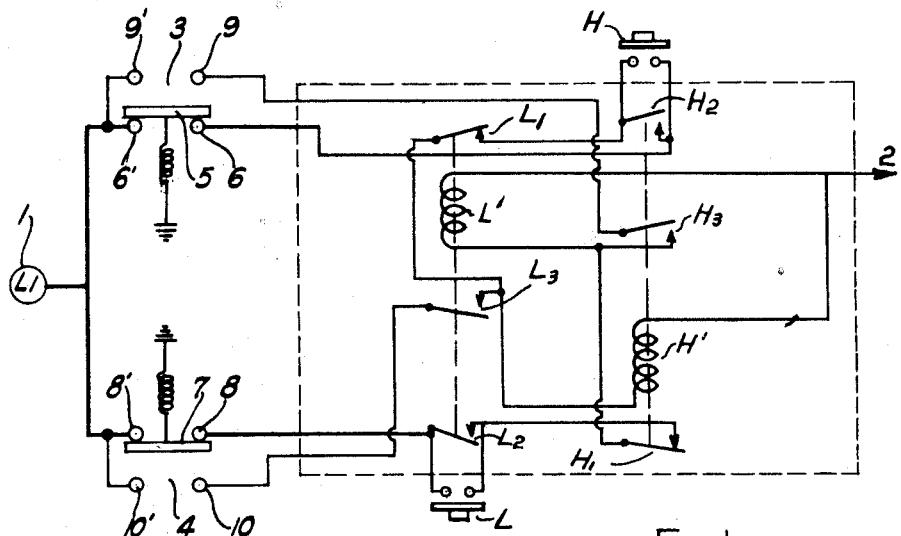

In the arrangement indicated in Fig. 1 only the diagram of the control apparatus is illustrated. 1 and 2 represent the supply-line terminals. 3 represents the upper hoist-limit switch at the end of the upper travel and 4 represents the lower limit switch at the lower end of the travel. It will be understood that while these positions are described as hoist and lowering, any other relationship such as "forward and back," "right and left" or "up and down" may be used to designate opposite ends of the limit of travel of the moving apparatus. These switches are normally closed in the position indicated in Fig. 1 with the contact bar 5 across the contact points 6 and 6' and the contact bar 7 across the contact points 8 and 8'. When the travelling gear is at the upper ends of its limit of motion, the contact bar 5 raised to a position across the contacts 9 and 9' while when the apparatus has travelled to the lower limit of its motion, the contact bar 7 is across the bars 10 and 10'. The hoist-control switch is represented as H and the lower control switch is represented as L.

H' represents the hoist coil and $L_1$ a normally closed switch in the hoist line. This switch is mechanically operated with the lower switches lettered L and remains closed through the hoist-line while the other L switches remain open. The hoist circuit is formed as a series circuit between the supply lines $L_1$ and $L_2$ through the hoist coil H', the switch $L_1$, the hoist switch H and the contacts 6 and 6' which are bridged by the bar 5. When the hoist switch H is operated manually, the hoist coil H' is energized which immediately closes the hoist hold switch $H_2$ permanently completing and holding the hoist-closing relay coil H'. This relay controls the supply of current to the motor for driving the hoisting mechanism none of which is illustrated in Fig. 1.

A similar arrangement of switches is operable for lowering the mechanism. This comprises the lowering manually operated switch L, the relay coil L', the holding lowering switch $L_2$, the relay coil L', the holding lowering switch $L_2$, the normally closed switch contacts $H_1$ which is closed when the hoist coil H' is not energized and the contact bar 7 which bridges the contacts 8 and 8'. When the coil L' is energized after the switch L is closed, the switch $L_2$ closes and keeps the coil L' energized during the lowering operation.

In addition to the switches which have been mentioned there are provided two additional switches $L_3$ and $H_3$. The $L_3$ switch is mechanically operated in the same manner as the $L_2$ switch and the $H_3$ switch as the $H_2$ switch. The circuit for each of these switches, however, is completed through the limit switch contacts; $L_3$ across the contacts 10 and 10', and $H_3$ across the contacts 9 and 9'. As a result, therefore, if the contacts on lowering should stay closed due to the sticking of the relay even though the coil L' becomes deenergized after the contact bar 7 is moved away from the contacts 8 and 8' by the lowering of the apparatus, a circuit will be closed by the same bar across the contacts 10 and 10'. This will complete a circuit from the terminal 2 through the hoist coil H', the contact L₃ which is closed due to the assumed sticking, the bar 7 across the contact points 10 and 10' to the other terminal 1, thus energizing the coil H' which closes the power contacts to reverse the rotation of the motor. This energization of the hoist coil H' will react positively to open the L switches L₂ and L₃ and close the switch L₁ by a mechanical interconnection between the two relays to be explained later, see Fig. 3.

Since the energization of the hoist coil H' operates to close the hoist switch H₂, a circuit will now be completed through the regular hoist control line similarly as when manual operation of the switch H had taken place. The switches are provided with sufficient delays so that there will be positive closing through the hoist controls as the lowering controls are released. As a result of this arrangement the driving motor instead of continuing to drive the lowering mechanism in the same direction will reverse and send the unit in the opposite direction which will continue in its motion until it has reached its upper limit.

While the operation above has been described in connection with the lower limit switch, the action is similar in connection with the upper limit switch as will be obvious from a consideration of the diagram of Fig. 1.

Figure 2:
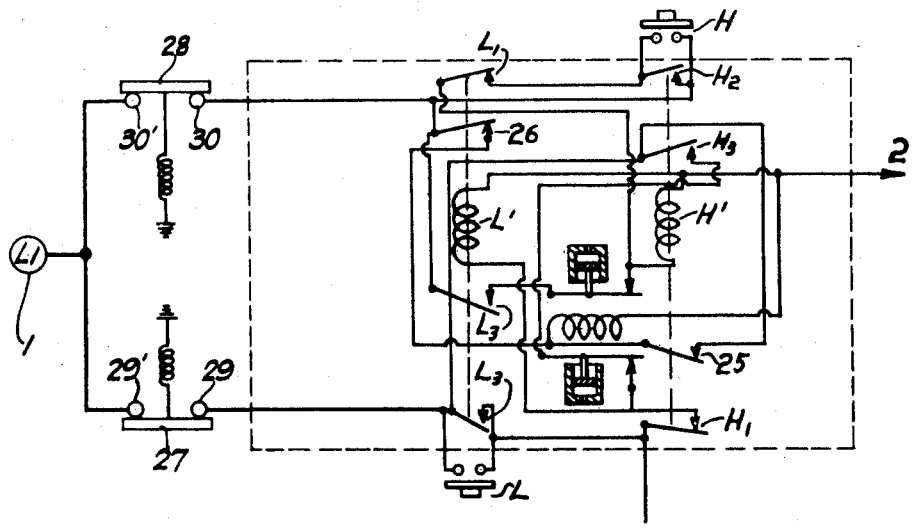
Fig. 2 shows a modification of the arrangement shown in Fig. 1.

In the diagram of Fig. 2 the basic circuit is the same as that of Fig. 1 and therefore the basic elements are numbered the same. The relay switch coils are H' and L'. The lowering and raising switches are L and H, respectively, and the holding switch contacts are L₂ and H₂, respectively. L₁ and H₁ are respectively the normally closed switch contacts in the hoisting and lowering circuit and operate with L' and H' respectively to open when the corresponding L and H switches are respectively closed. The switch L₃ in Fig. 2 operates in the same sense as the switch L₂, and the switch H₃ in the same sense as the switch H₂ as is the case in Fig. 1. In Fig. 2, however, their position in the circuit is slightly different because of the different arrangement of the rest of the circuit, as will be explained.

The circuit of Fig. 2 provides a relay 20 with two armature contact blades 21 and 22 which are slow acting and may be damped as indicated by the dash pots 23 and 24. The coil 20 is connected at one end to the line 2 and at the other end to a common junction of the contact switches 25 and 26. The contact switch 26 remains normally closed when the L group of switches is open (L₂). The contact 25 remains closed when the H (H₂) group of switches is open. When either the L group or the H group operates, then along with this either the switch 26 or 25 operates in the opposite sense. The same applies to the switches L₁ and H₁ as mentioned above. Single contact bars 27 and 28 bridge the contacts 29, 29' for the lower limit switch and 30 and 30' for the upper limit switch; the mechanism reaching its limits opens the circuit by pushing one or other of the bars 27 or 28 away from the contacts which they bridge. Normally the coil 20 is energized by the circuit completed from the terminal through the coil 20 through either of the closed contacts 25 or 26 and across one of the bars 27 or 28 to the terminal 1. Under these conditions the armature contacts 21 and 22 are held away from the fixed contact points 31 and 32. Under these conditions neither the H' coil nor the L' coil need be energized. If it is assumed, however, that the mechanism is at the top of its travel, then the bar 28 will not bridge the circuit between the contacts 30 and 30'. If the lowering switch L is pressed under these conditions, then the main circuit will be completed through the L' coil and the switch bar 27. This will close the contacts L₂, L₃ and open the contacts L₁ and 26, all of which mechanically operate together. The coil 20 will therefore remain energized but only through the closed switch 25 and the contact bar 27 bridging the contacts 29 and 29'. The coil H' will be unenergized because the switch L₁ is open and because the armature bar 22 is away from the contact point 32.

As in the operation of Fig. 1, the coil L₁ closes the motor circuit and sends the mechanism downward until it reacts against the limit switch and pushes the bar 27 away from the contacts 29 and 29'. This action will deenergize the main circuit, deenergizing the coil L' and if the L switches do not stick, L₂ and L₃ will open and L₁ and 26 will close and the coil 20 will remain energized, thus ceasing the operation of the entire mechanism.

If the relay controlled by L' sticks and the contacts L₂ and L₃ remain closed, then the following action will take place: The relay coil 20 will become deenergized since the switch 26 will remain open, and while the switch 25 remains closed, the circuit has been broken through the limit switch when the contact bar 27 leaves the contacts 29 and 29'. The armatures 21 and 22 will, after a short time interval, make contact with the contact points 31 and 32. This will complete the circuit through the coil H' in the following manner: From the terminal 2 through the coil H', through the contact points 32, the armature 22, the switch L₃ which is closed because of the assumed sticking of the relay, and the contact bar 28 bridging the contacts 30 and 30' to the other line terminal 1. The coil L' will remain deenergized at the same time. The closing of the circuit between the elements 22 and 32 will produce a positive action on the relay H' and due to mechanical interconnection between the two relays H and L, will act to open the contacts L₂ and L₃ and close the contacts 26 and L₁ at the same time through the action of the coil H'. The switches H₂ and H₃ are then closed, and 25 and H₁ opened, thus completing the holding circuit through the coil H' in the following manner; from the terminal 2 through the coil H', the switch L₁, the switch H₂, the contact bar 28 across the contact terminals 30 and 30' and the line 1. The coil L' will remain deenergized since the switch H₁ is opened and also the contact between the elements 21 and 31 since the coil 20 is now energized through a circuit comprising the terminal 2, the coil 20, the switch 26 and the contact bar 28 across the contacts 30 and 30' to the terminal 1.

In the same manner as previously described in connection with Fig. 1, the mechanism will, after opening the contacts at the bar 27, reverse its direction of travel and travel towards the top limit switch.

Figure 3:
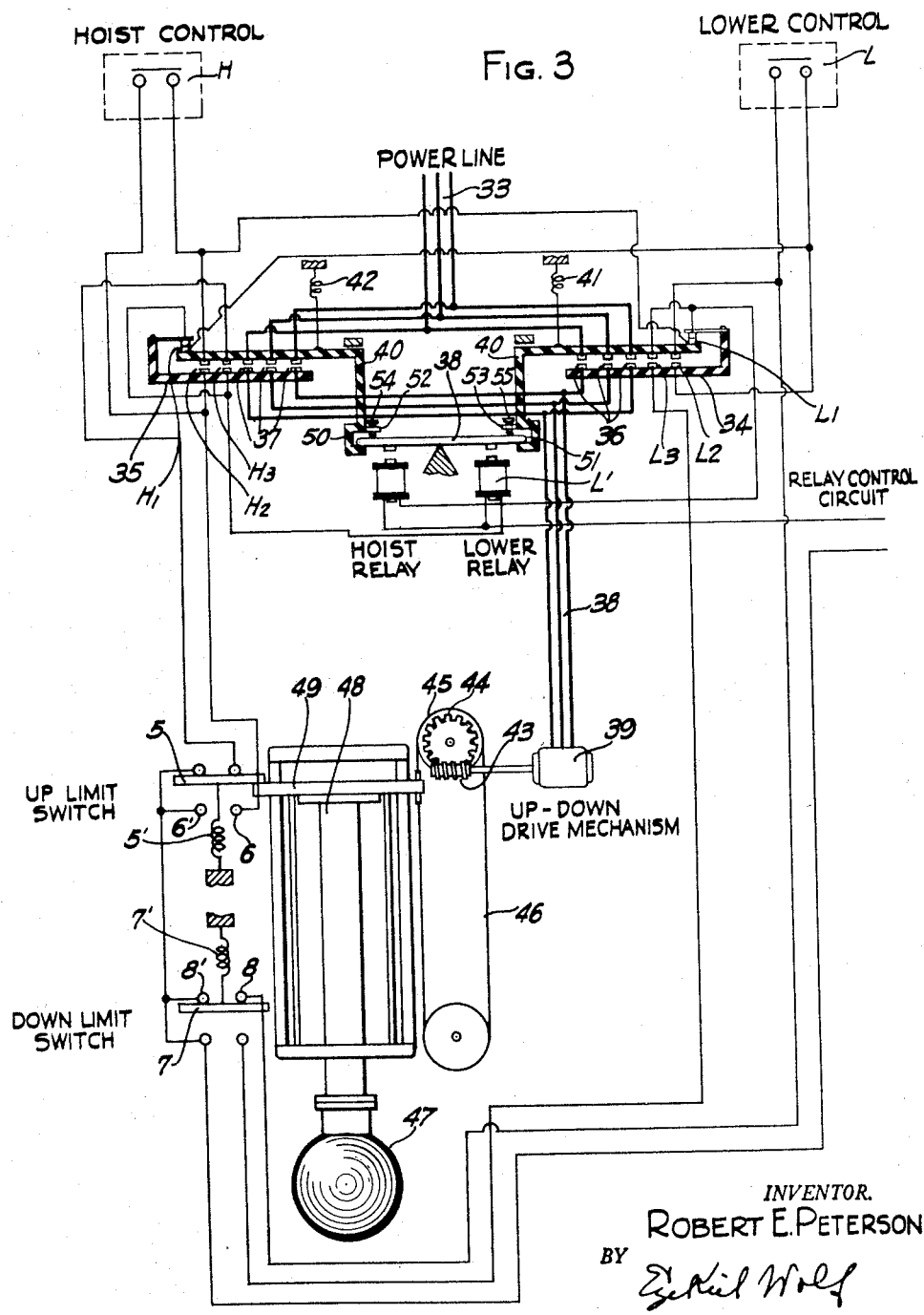
Fig. 3 shows a complete schematic diagram of the arrangement shown in Fig. 1.

The arrangement described in connection with Figs. 1 and 2 is shown with schematic operating elements in Fig. 3. In Fig. 3 the manual operating lowering switch is indicated by L corresponding to the same letter in Figs. 1 and 2, and the raising switch by H corresponding also to the same letter in Figs. 1 and 2. The power-supply lines are shown at 33 and these run both to the switch 34 for lowering and the switch 35 for raising, as indicated by the three contacts 36, 36, 36 on the switch 34 and 37, 37, 37 on the switch 35 from which the power is conducted over the line 38 to the motor 39. Each switch closes the circuit in phase relationship such that the operation is down when the lowering switch is closed and up when the raising switch is closed. The lowering relay coil L' is schematically shown as operating an armature 38 to pull down the arm 39 carrying the upper elements of the switch 36 for closing the motor circuit and the upper elements of the switches L₂ and L₃ as well as one of the contacts of the switch L₁ shown closed in the figure. The action of pulling down the armature 38 at the right in Fig. 3 raises the armature at the left pushing upwards the supporting arm 40 which carries the corresponding switch contacts for the hoisting switch. A pair of balancing springs 41 and 42 may be used to balance the operation of the switch arms one against the other. The raising switch 35 has a set of contacts H₃ and H₂ which are shown open and H₁ which is shown closed. The wiring circuit for these is exactly as shown in Fig. 1.

It may be noted in Fig. 3 that the ends of the armature 38 rest in recesses 50 and 51 of the supports 40 and 40', respectively, and that at the edge of these recesses there are provided small plates 52 and 53 carrying adjustment screws 54 and 55, respectively, for adjusting the operation of the switch. The switch may be adjusted in operation so that as one relay coil operates to draw down its end of the armature 38, the contacts on the other switch arm plates which are closed will open before the new group of contacts are made.

Under these conditions instead of the motor reversing and the gear being driven in the opposite direction, the coils H' and L' will both become deenergized and the apparatus come to rest at the limit of operation.

The up-down drive motor 39 is illustrated as operating through a worm 43, a gear 44 carrying a sprocket wheel 45 which drives the chain 46. The mechanism 47, which is lowered, is mounted on a shaft 48 which is driven up and down to the plate or bar 49 which has one end fixed to the driving chain 46. The plate 49, as illustrated, carries a contact finger which contacts either the bar 6 in the upper position or the bar 7 in the lower position. These bars are normally tensioned by springs 5' and 7' against the first set of contacts 6, 6' and 8, 8', respectively. The operation of the mechanism has already been explained in connection with the description of the circuit in Fig. 1. Simultaneously with the closing of the contact 36, the contacts L₂ and L₃ close while the contact L₁ opens. This same action positively insures opening of the switch contacts 37, H₂ and H₃ and the closing of H₁. This, then, follows in operation the exact arrangement as described in connection with Fig. 1.

The same arrangement as shown in Fig. 3 may also be applied to the circuit as illustrated in Fig. 2.

Figure 4:
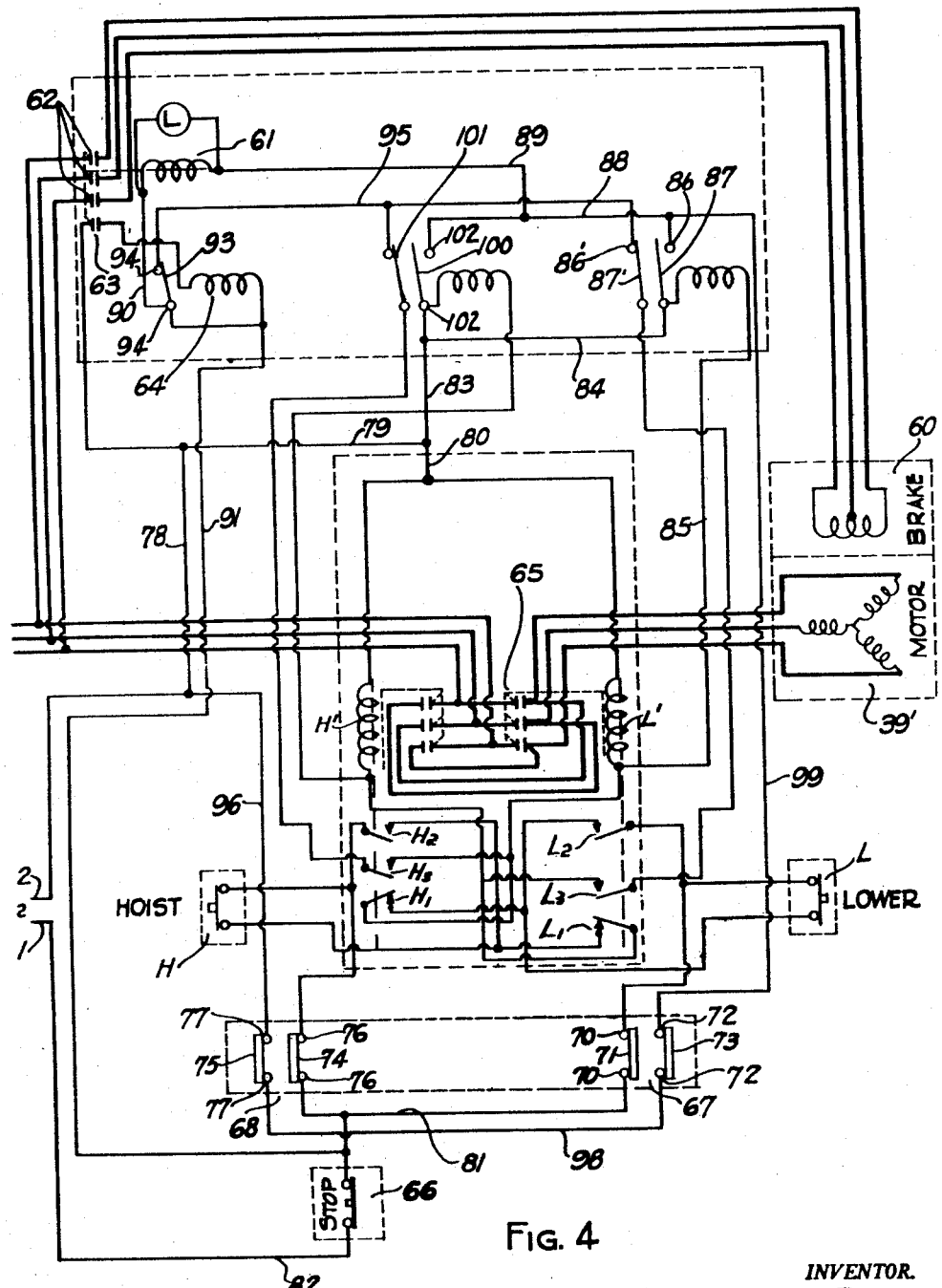
Fig. 4 shows a schematic wiring diagram of a modification of the diagram shown in Fig. 3.
Figure 5:
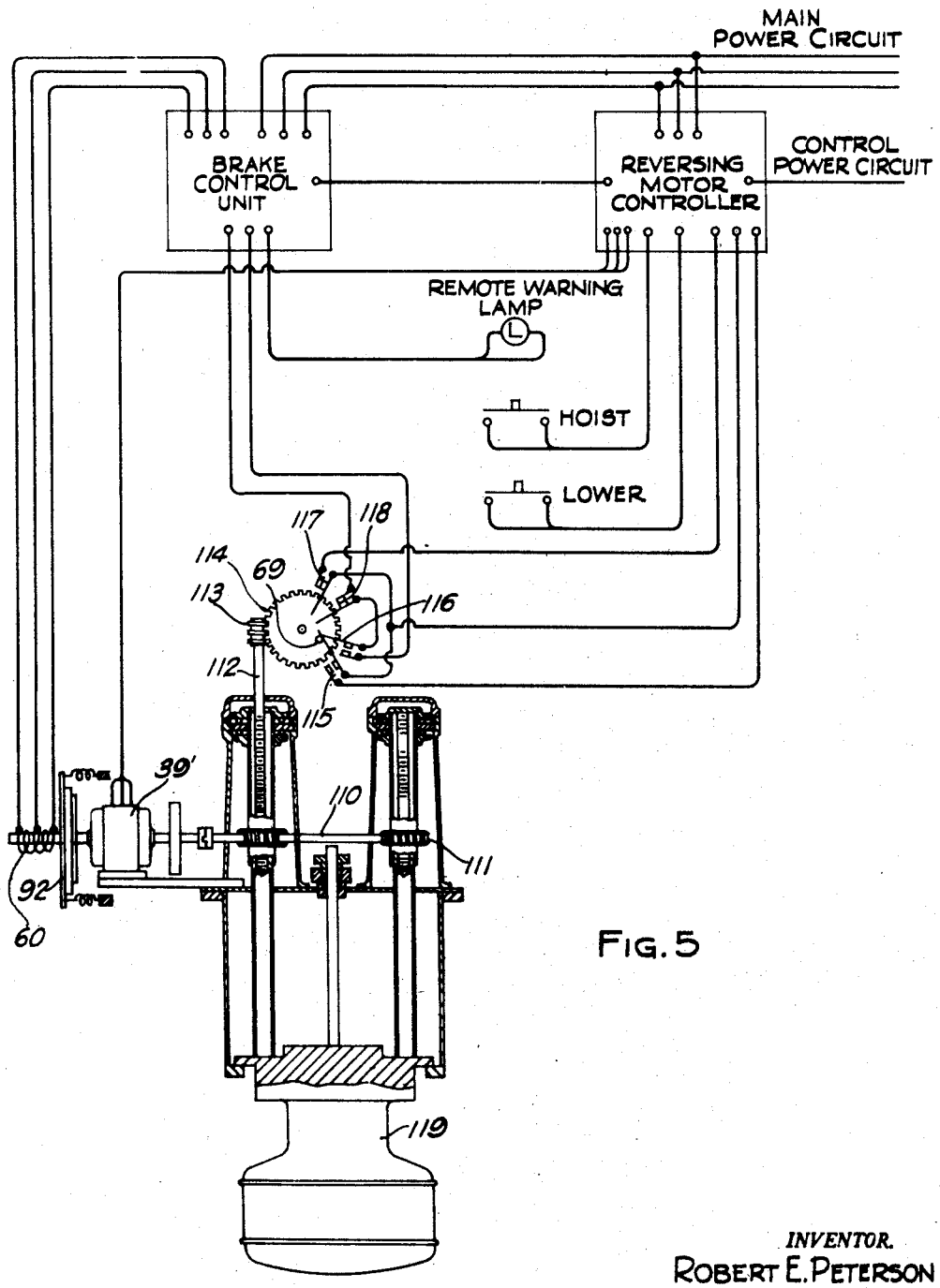
Fig. 5 shows the equivalent of the diagram shown in Fig. 4 with the apparatus more completely illustrated in Fig. 4.

In Figs. 4 and 5 an arrangement is shown in which a brake-operating mechanism is used in connection with the limit switch circuits as previously discussed. In Fig. 4 the same lettered and numbered characters refer to the same lettered and numbered elements as in Figs. 1 and 2. The motor in Fig. 4 for the up and down drive 39' is the equivalent of the motor shown in Fig. 3 except that it has a magnetically operated brake mechanism 60 which is controlled through a brake relay 61 having a group of contacts 62 for operating the brake coil and a contact 63 for controlling the protective relay coil 64 the function of which will be described later.

Fig. 4 also shows the reversing motor relay 65 which, as indicated in Fig. 3, is operative through the hoist and lower relay coils H' and L'. A stop switch 66 is also incorporated in Fig. 4. The limit switches in Fig. 4, 67 for the down limit switch 68 for the upper limit switch, are the same as the limit switch 69 shown in Fig. 5. As indicated in Fig. 4, when the mechanism is traveling against the down switch, first one group of contacts 70 is opened by the bar 71 and then a second group of contacts 72 by the bar 73. A similar arrangement is used in the hoist limit switch. The bars 74 and 75 open the circuit between the contacts 76 and 77, respectively. In the sequence followed in the operation of Fig. 4, first the motor becomes disconnected and is allowed to coast freely, then the brake is applied as the unit seats itself at the end of its motion. The operation of the circuit will be understood by a consideration of the operation of elements as the mechanism goes through its normal travel.

The adjustment of the switches is such that the brake is applied at such a time as to absorb considerable of the stored energy in the coasting motor armature when the ship is not moving. Thus, when the ship is underway with high speed, the energy is sufficient to carry the mechanism all the way down to the fully lowered position against the side thrust on the mechanism due to motion through the water. Thus, the brake acts as a regulation to insure completed lowering operation despite speed differences.

Assume that is desired to send the mechanism to the lower end of its course either when it is at the top or at some intermediate place. The lowering button L is pressed and power is thereby supplied across the line 1, 2, at the left of Fig. 4 through the relay coil L' in the following manner: over the line 78, 79 and 80 to the L' coil through the L₁ coil, the lower switch L, across the bar 71 to the line 81 through the stop switch 66 and the line 82 to the terminal 1. The energization of the coil L' closes the switches L₂ and L₃, opening the switch L₁. The switches H₂ and H₃ are assumed already to be open and the switch H₁ to be closed. Simultaneously with the energizing of the coil L' a circuit is completed across the coil n which is connected in shunt across the coil L' by means of the lines 83 and 84 connected to one end of the coil and the line 85 from the other end of the coil to a terminal of the coil L'. This action closes a circuit across the relay contacts 86 which is bridged by the armature 87 so that the brake coil 61 becomes energized through the armature bar 87, the line 88 and 89 going to one end of the relay coil and the line 90 going from the other end of the relay coil to the line 91 which connects through the stop switch 66 to the line 82 and the terminal 1. This action closes the relay contact 62 of the brake control unit retracting the brake plate 92, Fig. 5, against the action of the spring permitting the up-down motor 39' to drive the unit freely in the desired direction. The operation of the brake-control unit also closes the contacts 63 which energizes the coil 64 connected by means of the lines 78 and 91 across the terminals 1 and 2. The energizing of the coil 64 swings relay armature 93 clockwise as viewed in Fig. 4 breaking the circuit across the contact points 94, thus assuring that the line 95 is not connected to the supply terminal 1. As the mechanism travels to its lower limit, it first opens the circuit across the contact 70. This will deenergize the coils L' and n permitting the armature 87' to bridge across the contacts 86'. Since the coil 64, however, is still energized at this point, there is no connection across the contact points 94. As the down mechanism progresses further and opens the circuit across the contacts 72 by pushing away the bar 73, the circuit to the brake-relay coil 61 is broken. This circuit is traced in the following manner; from the terminal 2, the line 96, contacts 77, the bar 75, line 98, contact 72, bar 73, line 99, line 88, line 89, relay coil 61, line 90, line 91, stop switch 66, line 82 to terminal 1. The circuit is broken at the contact 72 and the brake coil 60 is thereby released permitting the springs to let the brake plate 92 act in stopping the motor. If, however, at this point the down relay has stuck so that the contacts L₂ and L₃ are still closed, the circuit to the hoist relay will be closed in the following manner; from the terminal 2, the lines 78, 79 and 80, through the coil H', the contact L₃ which is now presumed to be closed, the contacts 86' and the bar 87', the line 95, the contacts 94 which are now bridged by the armature 93, the line 91, the stop switch 66, the line 82 to the terminal 1.

The energization of the coil H' will simultaneously energize the coil U and operate to close the switches H₂ and H₃ while the switch H₁ will be open. The energizing of the coil U will draw the armature 100 and 101 over to the right and close a circuit across the contacts 102 so that the coil 61 of the brake relay will again be closed, thus permitting the motor to act freely in driving in the opposite direction or the direction of raising.

The switch at the upper end will operate in a similar manner in event that the H relay sticks after both the bars 74 and 75 have opened the limit switch circuit. In this case the lowering coil will be energized to reverse the motor and again the brake-relay coil will be energized so as to relieve the motor of the friction of the brake.

In the drawing of Fig. 5, the elements of Fig. 4 are somewhat schematically illustrated. The motor 39' driving a worm shaft 110 and worm wheel 111 raises and lowers the projecting gear 119. A long screw 112 connected with the hoisting and lowering gear drives a worm 113 which meshes with the worm gear 114 on which the limit switch 69 has one element mounted. The switch 115 corresponds to the contact bar 71 and the contact 70 of Fig. 4, and the switch 116 corresponds to the contact bar 73 and contact 72 of Fig. 4, while the switch 117 corresponds to the contact bar 74 and contact 76 and the switch 118 to the contact bar 75 and contact 77. The box labelled "Reversing motor controller" includes the relay controls for the H and L switches of Fig. 4, while the brake-control unit includes the relay-brake coils and switches and also the relays n, U and 64 with their contacts.

Having now described my invention, I claim:

1. A limit-switching system for a means adapted to be propelled towards a limit established by the position of the limit switch comprising a holding relay having contacts adapted to complete the circuit for propelling the unit towards the limit, means operative upon reaching the limit for breaking the circuit to said holding coil and normally deenergizing the propelling means, and means operative by further advance of the propelling means if said propelling means is not deenergized for reversing the drive of said propelling means.

2. A limit-switching system for a means adapted to be propelled in a given line of travel between two limiting positions at the end of the travel comprising independently manually operated switch-circuit means for driving said propelling means in one direction or the reverse thereof, said means including relay-holding means adapted to hold said circuits closed for driving in the desired directions, means operative upon reaching the limit of drive in either direction for breaking the circuit to said holding coil and normally deenergizing the propelling means, and means operative by further advance of the propelling means if said propelling means is not deenergized for reversing the driving of the propelling means.

3. A limit-switching system for a means adapted to be propelled in a given line of travel between two limiting positions at the end of the travel comprising independently manually operated switch-circuit means for driving said propelling means in one direction or the reverse thereof, said means including relay-holding means adapted to hold said circuits closed for driving in the desired directions, means operative upon reaching the limit of drive in either direction for breaking the circuit to said holding coil and normally deenergizing the propelling means and switching means, cross connecting said holding relay means for driving the first-mentioned means in a direction opposite to that in which it is being propelled, and means operative at the limit of the drive for operating said switching means for reversing said drive.

4. A limit-switching system for raising and lowering sound gear into and out of a vessel having limit switches for controlling the seating of the apparatus in its end positions comprises circuit holding means operative to control the operating of the driving means in either direction, and means controlled by said limit switch if the limit switch fails to function for changing the control of said circuit holding means for reversing the drive of said driving means.

5. In a limit-switching system for a means adapted to be propelled in a given line of travel between two limiting positions, a limit switch adapted to be opened by the means upon reaching its limiting position, holding relay means and switches operated thereby, said means having a reversing switch and means operative by the propelled means pressing forward of its limiting position for causing the relay means to operate said reversing switch.

6. In a limit-switching system for a means adapted to be propelled in a given line of travel between two limiting positions, a limit switch adapted to be opened by the means being propelled upon reaching its limiting position, holding relay means and switches operated thereby, said means comprising duplicate switching means operatively associated with each other whereby the operation of one set in one sense operates the other set in the other sense and means contained in the limit switch operative if the first-named means remains energized at the limit of its travel for causing the operation of said relay means in its reverse sense to reverse the energization of said first-named means.

7. In a limit-switching system for a means adapted to be propelled in a given line of travel between two limiting positions, a limit switch adapted to be opened by the means being propelled upon reaching its limiting position, holding relay means and switch operated thereby, said means comprising duplicate switching elements, one group of each of said duplicate elements adapted to reverse the direction of propulsion of said first-named means and the other group of said switching elements adapted to reverse the operation of said holding means if the propelled means continues to be operative at the limit of its travel whereby the drive of said propelled means is reversed.

8. A limit-switching system for raising and lowering sound gears into and out of a vessel having limit switches for controlling the seating of the apparatus in its end positions comprising a pair of limit switches operatively associated with the sound gear reaching its limiting positions, a motor for propelling the sound gear in its raising and lowering, a brake means, means operative when the sound gear reaches its limiting position for first deenergizing said motor and secondly for applying a brake thereto as the sound gear reaches its limiting positions.

9. A limit-switching system for raising and lowering the sound gear comprising a driving motor, a brake device, an operating circuit and a plurality of limit switches operatively associated with the approach of the sound gear to its limiting position, said operating circuit including means associated with the limit switches for deenergizing said motor upon reaching its limiting position and means operative with the deenergizing of said motor by the position of the gear in relation to the limit switch for applying the brake to said motor.

10. In a hoisting and lowering apparatus having sound gear at the bottom thereof including a limit-switching system for raising and lowering the sound gear, a driving motor, a brake device, an operating circuit and a plurality of limit switches operatively associated with the approach of the sound gear to its limiting position, said operating circuit including means associated with the limit switches for deenergizing said motor upon reaching its limiting position and means operative with the deenergizing of said motor by the position of the gear in relation to the limit switch for applying the brake to said motor and holding relay means included in said operating circuit having elements for reversing the direction of the operation of the motor if said driving motor fails to be deenergized.

11. In a hoisting and lowering apparatus having sound gear at the bottom thereof including a limit-switching system for raising and lowering the sound gears into and out of a vessel, limit switches for controlling the seating of the apparatus in its end positions comprising a pair of limit switches operatively associated with the sound gear reaching its limiting positions, a motor for propelling the sound gear in its raising and lowering, a pair of relays having associated groups of switches for reversing the operation of the propelling motor and means operative through said relays for opening one group before the other group is closed when the sound gear has reached its limiting position whereby the gear is brought to rest in its limiting position.

12. A limit-switching system for reciprocating a travelling element between limiting positions including a limit switch adapted to be operated when the travelling element has reached its limiting position, motor means adapted to drive said traveling element in either direction, relay and switch means operatively associated with said limit switch for selectively driving said travelling element in one or the other direction, and circuit means connected therewith energized through the operation of said limit switches for operating said relay means to reverse the direction of drive of said motor.

ROBERT E. PETERSON.

REFERENCES CITED

The following references are of record in the file of this patent:

UNITED STATES PATENTS

| Number | Name | Date |
| --- | --- | --- |
| 650,973 | Hill | June 5, 1900 |
| 1,215,573 | Otis | Feb. 13, 1917 |
| 1,768,650 | Wood | July 1, 1930 |
| 1,839,934 | Stansbury | Jan. 5, 1932 |